UNITED STATES PATENT OFFICE.

ADA S. BALDWIN, OF WESTTOWN, PENNSYLVANIA, ASSIGNOR TO WILLIAM J. BARNARD, OF SAME PLACE.

COMPOSITION FOR CLEANING AND POLISHING.

SPECIFICATION forming part of Letters Patent No. 631,553, dated August 22, 1899.

Application filed July 22, 1898. Serial No. 686,601. (Specimens.)

*To all whom it may concern:*

Be it known that I, ADA S. BALDWIN, residing at Westtown, in the county of Chester, State of Pennsylvania, have invented a new and useful Improvement in Compositions for Cleaning and Polishing, of which the following is a specification.

My invention is a composition of matter specially adapted for cleaning and polishing metals, glass, and precious stones; but it is also well adapted for cleaning and polishing woodwork and other surfaces, all of which are given a high and enduring luster without abrasion or injury.

The objects of my invention are to produce a composition which will effectively clean and produce a high and lasting polish without scratching or injuring the surfaces treated, to avoid dust and smearing, such as is common in the application of other compositions, to avoid injury to the hands of those applying it, and generally to produce an economical, effective, and non-injurious cleaning and polishing composition.

I have found the objects attained by a composition in finely-powdered form of whiting, borax, and Venetian red. The proportions which I have found most desirable and effective are by weight ninety-eight parts whiting, one part borax, and one part Venetian red; but it will be evident that these proportions may be varied without radically varying the properties of the composition. This powdered compound is incased in small sacks, preferably of canton-flannel, which are designed to be saturated with water and the sponge thus formed directly applied to the surface to be treated in its wet condition. The water with which the sponge has been soaked becomes saturated and softened by the preparation, which it carries through the fabric and deposits upon the surface to be or being treated. This surface while still wet is rubbed dry with a soft cloth, when it will be found that the stains have been removed and that a surface capable of polish has been given a high luster.

Having thus described my invention, I claim—

The herein-described composition for cleaning and polishing, consisting of whiting, borax and Venetian red, substantially as described.

ADA S. BALDWIN.

Witnesses:
GEORGE HOUSE,
WM. J. BARNARD.